United States Patent [19]

Mueller et al.

[11] Patent Number: 5,403,822
[45] Date of Patent: * Apr. 4, 1995

[54] ESTERS OF CARBOXYLIC ACIDS OF MEDIUM CHAIN-LENGTH AS A COMPONENT OF THE OIL PHASE IN INVERT DRILLING MUDS

[75] Inventors: Heinz Mueller, Monheim; Claus-Peter Herold, Mettmann; Stephan von Tapavicza, Erkrath; Michael Neuss, Cologne; Wolfgang Zoellner, Duesseldorf; Frank Burbach, Meerbusch, all of Germany

[73] Assignee: Henkel Kommanditgesellschaft auf Aktien, Germany

[*] Notice: The portion of the term of this patent subsequent to Oct. 19, 2010 has been disclaimed.

[21] Appl. No.: 68,563

[22] Filed: May 27, 1993

Related U.S. Application Data

[63] Continuation of Ser. No. 752,692, filed as PCT/EP90/00343, Mar. 1, 1990, published as WO90/10681, Sep. 20, 1990, abandoned.

[30] Foreign Application Priority Data

Mar. 8, 1989 [DE] Germany .................. 39 07 392.0

[51] Int. Cl.$^6$ .............. C09K 7/02; C09K 7/06
[52] U.S. Cl. .................... 507/138; 507/129
[58] Field of Search .......................... 507/138

[56] References Cited

PUBLICATIONS

"Vegetable Oils" in Kirk–Othmer Encyclopedia of Chemical Technology, 1982, vol. 23, pp. 717–731.

*Primary Examiner*—Gary Geist
*Attorney, Agent, or Firm*—Ernest G. Szoke; Wayne C. Jaeschke; Real J. Grandmaison

[57] ABSTRACT

The invention describes the use of selected esters, fluid at room temperature and with flash points above 80° C., from monocarboxylic acids of synthetic and/or natural origin with 6 to 11 carbon atoms and mono- and/or polyfunctional alcohols as the oil phase or a component of the oil phase of invert drilling muds, which are suitable for environment-friendly development of petroleum and natural gas deposits and in a continuous oil phase contain a dispersed aqueous phase together with emulsifiers, weighting agents, fluid-loss additives and preferably further conventional additives. In a further embodiment the invention relates to invert-drilling fluids of the types mentioned, which are characterized in that the oil phase contains esters of monocarboxylic acids of synthetic and/or natural origin with 6 to 11 carbon atoms and with mono- and/or polyfunctional alcohols preferably in admixture with other components from the class of ecologically acceptable compounds.

30 Claims, No Drawings

5,403,822

ESTERS OF CARBOXYLIC ACIDS OF MEDIUM CHAIN-LENGTH AS A COMPONENT OF THE OIL PHASE IN INVERT DRILLING MUDS

No. 07/752,692 filed as PCT/EP90/00343, Mar. 1, 1990, published as WO90/10681, Sep. 20, 1990, now abandoned.

BACKGROUND OF THE INVENTION

1. Field of the Invention

The invention discloses new drilling fluids based on ester oils and invert drilling muds built up thereon, which are distinguished by high ecological acceptability and at the same time good keeping and application properties. An important area of application for the new drilling fluid systems is in off-shore wells for the development of petroleum and/or natural gas deposits, the aim of the invention being particularly to make available technically usable drilling fluids with high ecological acceptability. The use of the new drilling fluid systems has particular significance in the marine environment, but is not limited thereto. The new mud systems can be put to quite general use even in land-based drilling, for example, in geothermal wells, water boreholes, in the drilling of geoscientific bores and in drilling for the mining industry. Here too it is essentially true that associated ecotoxic problems are simplified by the ester-base drilling oil fluids selected according to the invention.

2. Discussion of Related Art

Oil-base drilling fluids are generally used as so-called invert-emulsion muds, which consist of a three-phase system: oil, water and finely particulate solids. These are preparations of the W/O emulsion type, i.e. the aqueous phase is distributed as a heterogeneous fine dispersion in the continuous oil phase. To stabilize the system as a whole and to adjust the desired application properties a number of additives can be used, particularly emulsifiers or emulsifier systems, weighting agents, fluid-loss additives, alkali reserves, viscosity regulators and the like. For details, refer, e.g. to the publication by P. A. Boyd et al. "New Base Oil Used in Low-Toxicity Oil Muds" Journal of Petroleum Technology, 1985, 137 to 142, and R. B. Bennett, "New Drilling Fluid Technology—Mineral Oil Mud" Journal of Petroleum Technology, 1984, 975 to 981 and the literature cited therein.

The relevant technology has for some time recognized the importance of ester-base oil phases for reducing the problems caused by such oil-base muds. For example, U.S. Pat. Nos. 4,374,737 and 4,481,121 disclose oil-base drilling fluids in which non-polluting oils are used. The following are mentioned as non-polluting oils of equal value—mineral oil fractions free from aromatic hydrocarbons and vegetable oils such as peanut oil, soybean oil, linseed oil, corn oil, rice oil or even oils of animal origin, such as whale oil. Without exception, these named ester oils of vegetable and animal origin are triglycerides of natural fatty acids, which are known to have a high environmental acceptability, and are clearly superior from the ecological viewpoint when compared with hydrocarbon fractions—even when these are free from aromatic hydrocarbons.

Interestingly enough, however, none of the examples in the named U.S. Patent Specifications describes the use of such natural ester oils in invert-drilling fluids of the type in question here. In all cases, mineral oil fractions are used as the continuous oil phase. Oils of vegetable and/or animal origin are not considered for reasons of practicality. The rheological properties of such oil phases cannot be controlled for the wide temperature range reaching from 0° to 5° C. on the one hand and up to 250° C. on the other hand which is widely required in the industry.

In use, ester oils of the type in question do not in fact behave in the same way as the mineral oil fractions based on pure hydrocarbons which were previously used. Ester oils are subject to partial hydrolysis in practical use also and particularly in W/O invert drilling muds. Free carboxylic acids are formed as a result. The earlier Applications P 38 42 659.5 and P 38 42 703.6 (U.S. Ser. No. 07/452,457 titled "The Use of Selected Ester Oils in Drilling Fluids and Muds", now abandoned and U.S. Ser. No. 07/452,988 titled "Drilling Fluids and Muds Containing Selected Ester Oils"), now abandoned describe the problems caused thereby and give suggestions for their solution.

The subject of these earlier Applications is the use of ester oils based on selected monocarboxylic acids or monocarboxylic-acid mixtures and monofunctional alcohols with at least 2, and preferably with at least 4 carbon atoms. The earlier applications show that with the esters and ester mixtures they disclose, monofunctional reactants can not only be given satisfactory theological properties in fresh drilling fluid, but that by using selected known alkali reserves it is possible to work with the drilling fluid and in this way to inhibit undesirable corrosion. For the alkali reserve, one can add calcium hydroxide or lime and/or use zinc oxide or comparable zinc compounds. However, in this case an additional restriction is necessary. If undesired thickening of the oil-base invert mud system is to be prevented in practical use, the amount of alkalizing additive, and in particular the amount of lime, must be limited. The maximum amount provided is set at about 2 lb/bbl oil-base mud in the disclosure of the aforementioned earlier Applications.

The teaching of the invention described below widens the range of ester oils which can be used advantageously in the W/O drilling muds in question.

DESCRIPTION OF THE INVENTION

Other than in the operating examples, or where otherwise indicated, all numbers expressing quantities of ingredients or reaction conditions used herein are to be understood as modified in all instances by the term "about".

The subject of the invention is accordingly, in a first embodiment, the use of esters, fluid at room temperature and having flash points above 80° C., from monocarboxylic acids of synthetic and/or natural origin with 6 to 11 carbon atoms and mono- and/or polyfunctional alcohols as the oil phase or as a component of the oil phase of invert-drilling muds, which are suitable for environment-friendly development of petroleum or natural gas deposits, and in a continuous oil phase contain a dispersed aqueous phase together with emulsifiers, weighting agents, fluid-loss additives and preferably further conventional additives.

In a further embodiment the invention describes invert-drilling fluids of the above type, which are characterized in that the oil phase contains esters, fluid at room temperature and with flash points above 80° C., from synthetic and/or natural monocarboxylic acids with 6 to 11 carbon atoms and mono- and/or polyfunctional alcohols, preferably also in admixture with other components from the class of ecologically acceptable compounds (non-polluting oils).

Preferably, alcohol components are used in the thus defined ester oils which even after a partial ester cleavage are ecologically and toxicologically harmless in practical use, in particular the invention takes into account in this regard the inhalation-toxicological problems which can become significant when dealing with the oil-base mud in practical use.

The ester oils used according to the invention will be described in more detail below, the following sub-sections deal with possible mixture components and further details of the invention.

The ester oils used according to the invention

The ester oils described according to the invention are based, on the carboxylic acid side, on synthetic and/or natural monocarboxylic acids with 6 to 11 carbon atoms, which can be straight-chain and/or branched. Straight-chain and as a rule even-numbered carboxylic acids in this range can be derived particularly from oils or fats of natural origin and are known to form the so-called pre-fatty-acids with from 6 to 10 carbon atoms. Synthetic carboxylic acids of this type are also easily obtainable, for example, by the oxidation of Ziegler alcohols. Branched, or mixtures of branched and straight-chain carboxylic acids in this range can be obtained from numerous processes in the petrochemical industry.

Preferred esters of these carboxylic acids of medium chain length with mono- and/or polyfunctional alcohols are fluid and pumpable for the use according to the invention even in the temperature range of 0° to 5° C. As the oil phase, monocarboxylic acid esters of the above type are particularly used here or their admixtures with ecologically acceptable components—the so-called non-polluting oils, which in the temperature range of 0° to 5° C. have a Brookfield (RVT) viscosity of not above 50 mPas and preferably not above 40 mPas. Esters or ester mixtures of the aforementioned type, with a maximum viscosity of about 30 mPas, are particularly suitable.

The esters of the above type, which are preferably used in drilling mud, have in addition solidification values (pour and setting point) below 0° C., corresponding limit values below −5° C. and especially below −10° C. being particularly suitable. It is also desirable, particularly for reasons of industrial safety, for the flash points to be as high as possible, and therefore corresponding values of at least 90° C. and preferably above 100° C. are particularly appropriate. By suitable selection of the ester-forming components, the expert can achieve in a known manner the desired combination of substance properties for the ester oils referred to here.

The carboxylic acid esters, of medium chain length in the carboxylic acid unit, which are used according to the invention can be divided into two sub-classes: esters of these acids with monofunctional alcohols and esters of these acids with polyfunctional alcohols. The following specifications are used in the selection of the particularly suitable components.

Esters of the above type based on monofunctional alcohols preferably contain at least 6 and better still at least 7 carbon atoms in the alcohol component. With this comparatively high lower limit value for the alcohol component, it is possible to ensure that in practical use, even after a partial ester cleavage, toxicological and particularly inhalation-toxicological problems can be overcome by simple means. In practical use it is assumed that the at least slightly heated mud is re-circulated and freed, particularly by screening, from the drill cuttings it takes up. With progressive ageing and the partial hydrolysis thus caused, problems arise not only from the formation of free fatty acids and their salts as described in the aforementioned earlier Applications... U.S. Ser. Nos. 07/452,457, now abandoned and 07/452,988 now abandoned, but the freed alcohol components can also cause difficulties in practical operation. This alcohol content must always be taken into consideration if alcohol vapor nuisance is to be expected as a result of its volatility and the required operation temperatures. Lower monofunctional alcohols can create additional problems here which can be overcome, e.g. in constructive ways, but which in the preferred embodiment of the invention are excluded from the outset. If monofunctional alcohols of natural and/or synthetic origin which are predominantly aliphatic saturated are present in the ester oils used according to the invention, then such alcohols with 8 to 15 carbon atoms are preferably used for ester formation. Their vapor pressure is so low in the operational conditions occurring in practice that the problem area just addressed does not apply here.

Esters of monofunctional alcohols are not, however, limited to this carbon number range. Higher monofunctional alcohols can also be considered, of which the esters with the carboxylic acids of medium chain length defined according to the invention yield oils or oil components with usable rheological properties. Particularly to be considered here are olefin mono- and/or polyunsaturated alcohols which can, for example, have up to 24 carbon atoms or even higher numbers of carbon atoms. Alcohols of this type can be obtained in particular by the selective reduction of corresponding natural fatty acids, which will be discussed below in the context of further aspects of the invention description.

Inhalation-toxicological problems are as a rule insignificant from the outset when esters of polyfunctional alcohols are used. Di- to tetra-hydric alcohols are particularly suitable as the polyfunctional alcohols, especially the corresponding lower representatives of this class of substances with 2 to 6 carbon atoms. Particularly suitable polyfunctional alcohols are glycol and/or the propanediols. Ethylene glycol, 1,2-propanediol and/or 1,3-propanediol are accordingly particularly preferred alcohol components for the synthesis of the ester oils described according to the invention. Here both partial and complete esters of the type in question are considered, and the completely esterified products can be said to be particularly important especially for rheological reasons. Symmetrical and/or asymmetrical esters or ester mixtures can be used here, provided that carboxylic acids of the given carbon-number range are used at least in part with them.

The oil phase of the W/O emulsions can be formed exclusively from esters of the type described here, but the following mixture components can also be used together with the ester oils described in the invention.

Mixture components in the oil phase

Suitable oil components for admixture with the monocarboxylic acid esters of the invention are the mineral oils currently used in practice in drilling fluids, and preferably the aliphatic and/or cycloaliphatic hydrocarbon fractions essentially free from aromatic hydrocarbons with the required theological properties. Please refer here to the relevant prior art publications cited and the available commercial products.

Particularly important mixture components are, however, ester oils which are ecologically acceptable when used according to the invention, as described, for example, in the above earlier Applications U.S. Ser. Nos. 07/452,457, and 07/452,988, both abandoned. To complete the invention disclosure, essential characteristics of these esters or ester mixtures are briefly summarized below.

As the oil phase, in a first embodiment, esters are used of monofunctional alcohols with 2 to 12, particularly with 6 to 12 carbon atoms and aliphatically-saturated monocarboxylic acids with 12 to 16 carbon atoms, which esters are fluid and pumpable in the temperature range of 0° to 5° C., or an admixture thereof with at most about the same amounts of other monocarboxylic acids. Ester oils are preferred which at least to about 60% by weight—referred to the respective carboxylic acid mixture—are esters of aliphatic $C_{12-14}$-monocarboxylic acids and preferably for the remaining percentage are based on lower amounts of shorter-chain aliphatic and/or longer chain, and in particular olefin mono- or poly-unsaturated monocarboxylic acids. Esters are preferably used which in the temperature range of 0° to 5° C. have a Brookfield (RVT) viscosity in the range of not above 50 mPas, preferably not above 40 mPas and particularly of a maximum of about 30 mPas. The esters used in the drilling mud have solidification values (pour and setting point) below −10° C., preferably below −15° C. and have at the same time in particular flash points above 100° C., preferably above 150° C. The carboxylic acids present in the ester or ester mixture are straight-chain and/or branched and are of vegetable and/or synthetic origin. They can be derived from corresponding triglycerides such as coconut oil, palm kernel oil and/or babassu oil. The alcohol radicals of the esters used are derived in particular from straight-chain and/or branched saturated alcohols preferably with 6 to 10 carbon atoms. These alcohol components can also be of vegetable and/or animal origin and can thus be obtained by reductive hydration of corresponding carboxylic acid esters.

A further class of particularly suitable ester oils is derived from olefin mono- and/or poly-unsaturated monocarboxylic acids with 16 to 24 carbon atoms or their admixtures with lower amounts of other particularly saturated monocarboxylic acids and monofunctional alcohols with preferably 6 to 12 carbon atoms. These ester oils are also fluid and pumpable in the temperature range of 0° to 5° C. Particularly suitable are such esters derived to more than 70% by weight, preferably to more than 80% by weight and in particular to more than 90% by weight from olefin-unsaturated carboxylic acids with between 16 and 24 carbon atoms.

Here too the solidification values (pour and setting point) lie below −10° C., preferably below −15° C., while the flash points lie above 100° C. and preferably above 160° C. In the temperature range of 0° to 5° C. the esters used in the drilling mud have a Brookfield (RVT) viscosity of not more than 55 mPas, preferably not more than 45 mPas.

Two sub-classes can be defined for the ester oils of the type in question. In the first, the unsaturated $C_{16-24}$-monocarboxylic acid radicals present in the ester are derived to not more than 35% by weight from olefin di- and poly-unsaturated acids, with preferably at least about 60% by weight of the acid radicals being olefin mono-unsaturated. In the second embodiment the $C_{16-24}$-monocarboxylic acids present in the ester mixture are derived to more than 45% by weight, preferably to more than 55% by weight from olefin di- and/or poly-unsaturated acids. It is useful if the saturated carboxylic acids with between 16 to 18 carbon atoms which are present in the ester mixture do not amount to more than about 20% by weight and in particular not more than about 10% by weight. Preferably, saturated carboxylic acid esters, however, have lower carbon numbers in the acid radicals. The carboxylic acid radicals present can be of vegetable and/or animal origin. Vegetable starting materials are, for example, palm oil, peanut oil, castor oil and in particular rapeseed oil. The carboxylic acids of animal origin are particularly corresponding mixtures of fish oils, such as herring oil.

A further interesting class of ester oils which can be used as mixture components in the context of the use according to the invention is described in the co-pending Application. The Use of Selected Ester Oils of Low Carboxylic Acids in Drilling Fluids. Here it is a case of esters, fluid at room temperature and with flash points above 80° C., of $C_{1-5}$-monocarboxylic acids and mono- or polyfunctional alcohols, which preferably are also fluid and pumpable in the temperature range of 0° to 5° C. Particularly suitable are the corresponding esters of these lower carboxylic acids with monofunctional alcohols with at least 8 carbon atoms and/or esters of these acids with di- to tetra-hydric alcohols with preferably 2 to 6 carbon atoms. As ester-forming acid components of this class, for practical reasons the acetic acids are particularly suitable. The rheology and volatility measurements, or the setting values, of preferred esters of this sub-class correspond to the aforementioned values and are to be found in detail in the above Parallel Patent Application, to which reference is expressly made here for purposes of invention disclosure.

From this sub-class, particularly suitable as mixture components are esters of monofunctional alcohols of natural and/or synthetic origin, the chain length of which in the presence of predominantly aliphatic saturated alcohols can be in the range of 8 to 15 carbon atoms, in the case of olefin mono- and poly-unsaturated alcohols, however, can also be of higher carbon numbers, for example, up to 24 carbon atoms.

Multi-substance mixtures fall within the framework of the invention which, together with the ester oils defined according to the invention and based on carboxylic acids of medium chain length, can contain one or more of the mixture components listed in detail here. In principle, any mixtures can be used provided that they fulfil the basic rheological requirements for invert-drilling fluids of the type in question here. Examples of such multi-component mixtures are materials based on various types of ester oils or also substance mixtures additionally containing mineral oil.

The mixture ratios in the oil phase

The esters, as defined in the invention, of monocarboxylic acids of synthetic and/or natural origin with 6 to 11 carbon atoms and mono- and/or polyfunctional alcohols, are present at least as a substantial constituent in the oil phase, and in general with a percentage of at least about 20 to 25% by weight of the oil phase. In important embodiments at least about a third of the oil phase is formed by ester oils of this type, particularly important embodiments of the invention are characterized in that esters of the type described here form the main part of the continuous oil phase.

It was already indicated in the earlier Application P 38 42 703.6 U.S. Ser. No. 07/452,988, now abandoned, mentioned above, that particularly when saturated fatty acids of natural origin are used limited amounts of esters of the so-called pre-fatty acids—i.e. those of the range of from 6 to 10 carbon atoms—can also be used with them. In any case these are generally comparatively small amounts, depending on the origin of these saturated fatty acid mixtures amounting at most to about 15% by weight. The teaching of the present invention therefore also extends further in this regard than the details in the above earlier Application.

Further mixture components of the invert-drilling fluid

All the usual constituents of mixtures for conditioning and for the practical uses of invert drilling muds can be considered here as are currently used with mineral oils as the continuous oil phase. In addition to the dispersed aqueous phase, emulsifiers, weighting agents, fluid-loss additives, viscosifiers and alkali reserves can be considered here.

Use is also made in a particularly important embodiment of the invention, of the further development of these ester oil-base invert drilling fluids which is the subject of the Applicant's earlier Application . . . U.S. Ser. No. 07/478,185 titled "Oleophilic Basic Amine Compounds As An Additive For Invert Drilling Muds", now abandoned.

The teaching of this earlier Application is based on the concept of using a further additive in ester oil-base invert drilling fluids, which is suited to keeping the desired rheological data of the drilling fluid in the required range even when, in use, increasingly large amounts of free carboxylic acids are formed by partial ester hydrolysis. These liberated carboxylic acids should not only be trapped in a harmless form, it should moreover be possible to reform these free carboxylic acids, preferably into valuable components with stabilizing or emulsifying properties for the whole system. According to this teaching, alkaline amine compounds of marked oleophilic nature and at best limited water solubility, which are capable of forming salts with carboxylic acids, can be used as additives in the oil phase. The oleophilic amine compounds can at the same time be used at least in part as alkali reserves in the invert drilling fluid, they can however also be used in combination with conventional alkali reserves, particularly together with lime. The use of oleophilic amine compounds which are at least largely free from aromatic constituents is preferred. In particular, optionally olefin unsaturated aliphatic, cycloaliphatic and/or heterocyclic oleophilic basic amine compounds, can be considered, which contain one or more N-groups capable of forming salts with carboxylic acids. In a preferred embodiment the water-solubility of these amine compounds at roam temperature is at most about 5% by weight and is most preferably below 1% by weight.

Typical examples of such amine compounds are primary, secondary and/or tertiary amines, which are at least predominantly water-insoluble, and which can also to a limited extent be alkoxylated and/or substituted particularly with hydroxyl groups. Further examples are corresponding aminoamides and/or heterocycles containing nitrogen as ring constituent. For example, basic amine compounds are suitable which have at least one long-chain hydrocarbon radical with preferably 8 to 36 carbon atoms, particularly with 10 to 24 carbon atoms, which can also be olefin mono- or polyunsaturated. The oleophilic basic amine compounds can be added to the drilling fluid in amounts of up to about 10 lb/bbl, preferably in amounts up to about 5 lb/bbl and particularly in the range of about 0.1 to 2 lb/bbl.

It has emerged that the use of such oleophilic basic amine compounds can effectively prevent thickening of the mud system, which presumably can be attributed to a disturbance in the W/O invert system and also to the formation of free carboxylic acids by ester hydrolysis.

In a preferred embodiment of the use according to the invention, care is taken that considerable amounts of strongly hydrophilic bases of inorganic and/or organic nature are not used in the oil-base mud. In particular the invention refrains from using alkali hydroxides or strongly hydrophilic amines such as diethanolamine and/or triethanolamine. Lime can also be used effectively as an alkali reserve. It is then useful to limit the maximum amount of lime to be used to about 2 lb/bbl, and it may be preferred to work with lime contents in the drilling mud slightly below this, e.g., therefore from about 1 to 1.8 lb/bbl (lime/drilling fluid). Other known alkali reserves can be used in addition to or in place of the lime. The less basic metal oxides, such as zinc oxide, should particularly be mentioned here. Even when these acid traps are used, care is still taken that the amounts used are not too large, so as to prevent undesired premature ageing of the drilling fluid, associated with an increase in viscosity and therefore a deterioration in the rheological properties. The special features discussed here of the process according to the invention prevent, or at least restrict, the formation of undesirable amounts of highly active O/W emulsifiers, so that the good rheological properties are maintained for a sufficiently long time in use even when there is thermal ageing.

The following also applies:

Invert-drilling muds of the type in question here usually contain, together with the continuous oil phase, the finely dispersed aqueous phase in amounts of about 5 to 45% by weight and preferably in amounts of about 5 to 25% by weight. A dispersed aqueous phase from about 10 to 25% by weight can be regarded as particularly useful.

The following rheological data apply to the rheology of preferred invert drilling fluids according to the invention: Plastic viscosity (PV) from about 10 to 60 mPas, preferably about 15 to 40 mPas. Yield point (YP) from about 5 to 40 lb/100 ft$^2$, preferably about 10 to 25 lb/100 ft$^2$—each measured at 50° C. For the measurement of these parameters, for the measuring methods used and for the rest of the conventional composition of the invert drilling fluids described here, refer in detail to the specifications in the prior art which were cited above and are, for example, described fully in the handbook "Manual of Drilling Fluids Technology" of NL-Baroid Co., London, GB, particularly in the chapters "Mud Testing—Tools and Techniques" and "Oil Mud Technology", which is freely accessible to interested experts. In summary, for the purposes of completing the invention disclosure the following can be said:

The emulsifiers that can be used in practice are systems which are suitable for the formation of the required W/O emulsions. In particular, selected oleophilic-fatty acid salts, for example, those based on amidoamine compounds can be considered. Examples of these are described in the already cited U.S. Pat. No. 4,374,737 and the literature cited there. A particularly suitable type of emulsifier is the product sold by NL-Baroid Co. under the brand name "EZ-mul".

Emulsifiers of the type in question are sold commercially as highly concentrated active-substance preparations and can, for example, be used in amounts of about 2.5 to 5% by weight, particularly in amounts of about 3 to 4% by weight—each based on the ester oil phase.

In practice, hydrophobized lignite in particular is used as the fluid-loss additive and therefore particularly for forming a dense coating on the borehole walls of a largely liquid-impermeable film. Suitable amounts are, for example, from about 15 to 20 lb/bbl or from about 5 to 7% by weight, based on the ester oil phase.

The viscosifier conventionally used in drilling fluids of the type in question here is a cation-modified finely particulate bentonite, which can be used particularly in amounts of about 8 to 10 lb/bbl or in the range of about 2 to 4% by weight, based on the ester oil, phase. The weighting material conventionally used in relevant applications to establish the necessary pressure compensation is barite, and the amounts added are varied according to the drilling conditions anticipated in each case. It is, for example, possible by adding barite to raise the specific gravity of the drilling fluid to values up to 2.5 and preferably from about 1.3 to 1.6.

The dispersed aqueous phase in these invert drilling fluids is loaded with soluble salts. Calcium chloride and/or potassium chloride are mainly used here, and saturation of the aqueous phase at room temperature with the soluble salt is preferred.

The aforementioned emulsifiers or emulsifier systems serve optionally also to improve the oil wettability of the inorganic weighting materials. In addition to the aminoamides already mentioned, further examples are alkylbenzene sulfonates and imidazoline compounds. Additional information regarding the relevant prior art can be found in the following publications: GB 2 158 437, EP 229 912 and DE 32 47 123.

The drilling fluids synthesized according to the invention using ester oils of the aforementioned type are distinguished, in addition to the advantages already described by a notably improved lubricity. This is particularly important when in very deep wells, for example, the path of the drill rod and therefore the borehole deviates from the vertical. The rotating drill rod comes slightly into contact with the borehole wall and when operating buries itself into it. Ester oils of the type used as the oil phase according to the invention have a notably better lubricity than the mineral oils previously used. This is another important advantage for the method according to the invention.

EXAMPLES

In the following examples invert drilling fluids are prepared in the conventional manner using the following basic formulation:

| | | |
|---|---|---|
| 230 ml | ester oil | |
| 26 ml | water | |
| 6 g | organophilic bentonite (Geltone II of NL Baroid Co.) | |
| 12 g | organophilic lignite (Duratone of NL Baroid Co.) | |
| x g | lime (x = 1 or 2) | |
| 6 g | W/O emlsifier (EZ-mul NT of NL Baroid Co.) | |
| 346 g | barite | |
| 9.2 g | CaCl$_1$ × 2 H$_2$O | |

In this formulation about 1.35 g of lime corresponds to 2 lb/bbl.

After a W/O invert drilling fluid has been prepared in a known manner from the components used, with variation of the ester oil phase, the viscosity values of the unaged and then the aged material are determined as follows:

Measurement of the viscosity at 50° C. in a Fann-35-viscosimeter supplied by NL Baroid Co. The plastic viscosity (PV), the yield point (YP) and the gel strengths (lb/100 ft$^2$) are determined in a known manner after 10 sec. and 10 min.

Ageing is carried out by treatment in autoclaves—in the so-called roller-oven—for a period of 16 hours at 125° C.

Example 1

As the ester oil, the reaction product of isononanic acid and isoheptanol is used—an ester with a flash point of 145° C. and a setting point below −10° C. The amount of lime in the basic formulation given above is 2 g in this test.

The values determined for the unaged and aged material are listed in the following table.

| | unaged material | aged material |
|---|---|---|
| plastic viscosity (PV) | 26 | 31 |
| yield point (YP) | 14 | 14 |
| gel strengths (lb/100 ft$^2$) | | |
| 10 sec. | 5 | 6 |
| 10 min. | 8 | 9 |

Example 2

The formulation in Example 1 is repeated, but with the amount of lime used in the basic formulation as 1 g. The values determined for the unaged and aged material are as follows:

| | unaged material | aged material |
|---|---|---|
| plastic viscosity (PV) | 28 | 31 |
| yield point (YP) | 8 | 8 |
| gel strengths (lb/100 ft$^2$) | | |
| 10 sec. | 5 | 5 |
| 10 min. | 7 | 7 |

Example 3

The esterification product of 2-ethylhexanol and C$_{6-10}$ pre-fatty acids (Applicant's commercial product "Edenor") is used in the following Examples 3 and 4 as the ester oil. The ester oil has a flash-point of about 151° C. and a setting point of below −10° C.

The viscosity values of the unaged and aged material which were determined with 2 g of lime added to the basic formulation, are collected in the following table.

| | unaged material | aged material |
|---|---|---|
| plastic viscosity (PV) | 28 | 33 |
| yield point (YP) | 7 | 12 |
| gel strengths (lb/100 ft$^2$) | | |
| 10 sec. | 5 | 6 |
| 10 min. | 8 | 16 |

Example 4

The formulation in Example 3 is repeated, but the amount of lime added in the ester-oil base mud is 1 g. The viscosity values determined for the unaged and aged material are as follows.

|                           | unaged material | aged material |
|---------------------------|-----------------|---------------|
| plastic viscosity (PV)    | 24              | 23            |
| yield point (YP)          | 12              | 12            |
| gel strengths (lb/100 ft²) |                 |               |
| 10 sec.                   | 5               | 5             |
| 10 min.                   | 7               | 6             |

Example 5

The ester oil from Examples 1 and 2—ester from isononanic acid/isoheptanol—is used in a further ester-base mud with an oil/water ratio of 80/20 with the same addition of 2 g of a strongly oleophilic amine (Applicant's commercial product "Araphen G2D"—the reaction product of an epoxidized $C_{12/14}$-alpha-olefin and diethanol amine) in the following basic formulation:

| 210 ml | ester oil                                  |
| 48.2 g | water                                      |
| 6 g    | orgamphilic bentonite (Omnigel)            |
| 13 g   | organophilic lignite (Duratone of NL Baroid Co.) |
| 2 g    | lime                                       |
| 8 g    | W/O-emulsifier (EZ-mul NT of NL Baroid Co.) |
| 270 g  | barite                                     |
| 20 g   | $CaCl_2 \times 2\, H_2O$                   |

The viscosity values determined for the unaged and aged material are collected in the following table.

|                           | unaged material | aged material |
|---------------------------|-----------------|---------------|
| plastic viscosity (PV)    | 35              | 32            |
| yield point (YP)          | 31              | 20            |
| gel strengths (lb/100 ft²) |                 |               |
| 10 sec.                   | 12              | 7             |
| 10 min.                   | 14              | 9             |

Examples 6 to 9

In the basic formulation in Examples 1 and 2—using 1 g of lime as in Example 2—the following four esters are used as the oil phase and their rheological values determined as described in Examples 1 and 2 before and after ageing:

Example 6: Ester from 2-ethylhexanol and $C_8$-acid, flash point 152° C., viscosity at 20° C. 4 to 5 mPas, at 50° C. 2 to 3 mPas, setting point below −10° C.

Example 7: Ester from 2-ethylhexanol and $C_{10}$-acid with the flash point of 166° C., viscosity at 20° C. 4 to 5 mPas, at 50° C. 2 to 3 mPas, setting point about −10° C.

Example 8: Ester from n-octanol (Applicant's commercial product "Lorol") and $C_{10}$-carboxylic acid (Applicant's commercial product "Edenor") with a flash point of 171° C., viscosity at 20° C. 6 mPas, at 50° C. 3 mPas and a setting point of +3° C.

Example 9: Ester from isononanic acid and n-octanol (Applicant's commercial product "Lorol").

The rheological data determined in each case before and after the ageing are the following:

Example 6

|                           | unaged material | aged material |
|---------------------------|-----------------|---------------|
| plastic viscosity (PV)    | 21              | 22            |
| yield point (YP)          | 15              | 11            |
| gel strengths (lb/100 ft²) |                 |               |
| 10 sec.                   | 6               | 8             |
| 10 min.                   | 8               | 5             |

Example 7

|                           | unaged material | aged material |
|---------------------------|-----------------|---------------|
| plastic viscosity (PV)    | 29              | 31            |
| yield point (YP)          | 8               | 8             |
| gel strengths (lb/100 ft²) |                 |               |
| 10 sec.                   | 5               | 5             |
| 10 min.                   | 7               | 7             |

Example 8

|                           | unaged material | aged material |
|---------------------------|-----------------|---------------|
| plastic viscosity (PV)    | 26              | 28            |
| yield point (YP)          | 17              | 14            |
| gel strengths (lb/100 ft²) |                 |               |
| 10 sec.                   | 6               | 4             |
| 10 min.                   | 8               | 7             |

Example 9

|                           | unaged material | aged material |
|---------------------------|-----------------|---------------|
| plastic viscosity (PV)    | 27              | 29            |
| yield point (YP)          | 12              | 13            |
| gel strengths (lb/100 ft²) |                 |               |
| 10 sec.                   | 5               | 4             |
| 10 min.                   | 7               | 7             |

Examples 10 and 11

Two further ester oils were processed according to the basic formulation in Example 1 (2 g lime) into drilling fluids of the type mentioned. Their basic rheological data were determined before and after ageing for 16 hours in the roller-oven at 125° C.

Example 10

Ester oil from $C_{8/10}$ pre-fatty acids (Applicant's commercial product "V85KR") and isotridecyl alcohol, flash point 183° C., setting point below −10° C.

|                           | unaged material | aged material |
|---------------------------|-----------------|---------------|
| plastic viscosity (PV)    | 44              | 55            |
| yield point (YP)          | 13              | 24            |
| gel strengths (lb/100 ft²) |                 |               |
| 10 sec.                   | 6               | 7             |
| 10 min.                   | 8               | 10            |

Example 11

Ester oil based on the $C_{8/10}$ pre-fatty acids mentioned in Example 10 and 2-ethylhexanol with a flash point of 151° C. and a setting point below −10° C.

|                           | unaged material | aged material |
|---------------------------|-----------------|---------------|
| plastic viscosity (PV)    | 24              | 35            |
| yield point (YP)          | 10              | 15            |
| gel strengths (lb/100 ft²) |                 |               |
| 10 sec.                   | 5               | 5             |

|  | unaged material | aged material |
|---|---|---|
| 10 min. | 7 | 14 |

Example 12

In a further series of tests 2 g of a strongly oleophilic amine (Applicant's commercial product "Araphen G2D") is added as an anti-ageing agent to an ester oil as in Example 11. The ageing in the roller oven at 125° C. is now extended to a period of 72 hours. The rheological data determined for the unaged and aged material are as follows.

|  | unaged material | aged material |
|---|---|---|
| plastic viscosity (PV) | 24 | 24 |
| yield point (YP) | 8 | 14 |
| gel strengths (lb/100 ft$^2$) | | |
| 10 sec. | 4 | 5 |
| 10 min. | 6 | 7 |

In the same way, the indicated amount of the formulation in Example 10 is mixed with the anti-ageing agent mentioned and the oil-base mud based on this mixture is aged for a period of 72 hours in the roller oven at 125° C. The rheological data determined before and after ageing are as follows.

|  | unaged material | aged material |
|---|---|---|
| plastic viscosity (PV) | 43 | 66 |
| yield point (YP) | 14 | 24 |
| gel strengths (lb/100 ft$^2$) | | |
| 10 sec. | 7 | 9 |
| 10 min. | 9 | 13 |

We claim:

1. An invert emulsion drilling mud composition suitable for environmentally-compatible development of petroleum and natural gas deposits, consisting essentially of
   (a) a continuous oil phase consisting essentially of an ester of a $C_6$–$C_{11}$ monocarboxylic acid and a monofunctional alcohol, said ester being fluid at room temperature and having a flash point above 80° C.,
   (b) an aqueous phase dispersed in said oil phase,
   (c) a water-in-oil emulsifier,
   (d) a weighting agent,
   (e) a viscosifier,
   (f) a fluid loss additive, and
   (g) an alkali reserve component.

2. An invert emulsion drilling mud composition as in claim 1 wherein said ester has a Brookfield (RVT) viscosity of less than about 50 mPas at a temperature of about 0 to about 5° C.

3. An invert emulsion drilling mud composition as in claim 1 wherein said aqueous phase is present in an amount of from about 5 to about 45 percent by weight, based on the weight of said oil phase.

4. An invert emulsion drilling mud composition as in claim 1 having a plastic viscosity of from about 10 to about 60 mPas, and a yield point of from about 5 to about 40 lbs./100 ft.$^2$, each measured at about 50° C.

5. An invert emulsion drilling mud composition as in claim 1 wherein said ester has a pour and setting point of below 0° C. and a flash point above 90° C.

6. An invert emulsion drilling mud composition as in claim 1 wherein said ester is prepared from a monofunctional alcohol having at least 6 carbon atoms.

7. An invert emulsion drilling mud composition as in claim 1 wherein said monofunctional alcohol comprises an aliphatic saturated alcohol having from 8 to 15 carbon atoms.

8. An invert emulsion drilling mud composition as in claim 1 wherein said alcohol comprises an unsaturated alcohol having up to 24 carbon atoms.

9. An invert emulsion drilling mud composition as in claim 1 wherein said oil phase contains another ecologically acceptable oil selected from the group consisting of (a) a monocarboxylic acid ester of a $C_2$–$C_{12}$ monofunctional alkanol wherein the monocarboxylic acid contains from 12 to 16 carbon atoms and is aliphatically saturated, and (b) a monocarboxylic acid ester of a $C_2$–$C_{12}$ monofunctional alcohol wherein the monocarboxylic acid contains from 16 to 24 carbon atoms and is olefinically mono- or poly-unsaturated.

10. An invert emulsion drilling mud composition as in claim 1 wherein said alkali reserve component is substantially free from highly hydrophilic basic materials selected from the group consisting of alkali metal hydroxides and amines selected from diethanolamine and triethanolamine.

11. An invert emulsion drilling mud composition as in claim 1 wherein said alkali reserve component is selected from a mildly alkaline metal oxide, an oleophilic basic amine, and lime.

12. An invert emulsion drilling mud composition as in claim 1 wherein said oil phase contains an ester of a $C_1$–$C_5$ monocarboxylic acid and a monofunctional alcohol.

13. The process of developing sources of oil and gas by drilling using a drilling mud, comprising pumping the invert emulsion drilling mud composition of claim 1 into said sources being drilled.

14. The process of developing sources of oil and gas by drilling using a drilling mud, comprising pumping the invert emulsion drilling mud composition of claim 3 into said sources being drilled.

15. The process of developing sources of oil and gas by drilling using a drilling mud, comprising pumping the invert emulsion drilling mud composition of claim 6 into said sources being drilled.

16. The process of developing sources of oil and gas by drilling using a drilling mud, comprising pumping the invert emulsion drilling mud composition of claim 7 into said sources being drilled.

17. The process of developing sources of oil and gas by drilling using a drilling mud, comprising pumping the invert emulsion drilling mud composition of claim 8 into said sources being drilled.

18. The process of developing sources of oil and gas by drilling using a drilling mud, comprising pumping the invert emulsion drilling mud composition of claim 9 into said sources being drilled.

19. The process of developing sources of oil and gas by drilling using a drilling mud, comprising pumping the invert emulsion drilling mud composition of claim 10 into said sources being drilled.

20. The process of developing sources of oil and gas by drilling using a drilling mud, comprising pumping the invert emulsion drilling mud composition of claim 11 into said sources being drilled.

21. The process of developing sources of oil and gas by drilling using a drilling mud, comprising pumping the invert emulsion drilling mud composition of claim 12 into said sources being drilled.

22. A drilling fluid suitable for use in an invert emulsion drilling mud composition for the environmentally-compatible development of petroleum or natural gas deposits, said fluid having an oil phase and an aqueous phase containing a salt selected from the group consisting of alkali metal and alkaline earth salts, said oil phase consisting essentially of an ester oil of a $C_6$-$C_{11}$ monocarboxylic acid and a monofunctional alcohol, said ester oil being fluid at room temperature and having a flash point above 80° C.

23. A drilling fluid as in claim 22 wherein said ester oil has a Brookfield (RVT) viscosity of less than about 50 mPas at a temperature of about 0° to about 5° C.

24. A drilling fluid as in claim 22 wherein said ester oil is prepared from a monofunctional alcohol having at least 6 carbon atoms.

25. A drilling fluid as in claim 22 wherein said monofunctional alcohol comprises an aliphatic saturated alcohol having from 8 to 15 carbon atoms.

26. A drilling fluid as in claim 22 wherein said alcohol comprises an unsaturated alcohol having up to 24 carbon atoms.

27. A drilling fluid as in claim 22 wherein said drilling fluid contains another ecologically acceptable oil selected from the group consisting of (a) a monocarboxylic acid ester of a $C_2$-$C_{12}$ monofunctional alkanol wherein the monocarboxylic acid contains from 12 to 16 carbon atoms and is aliphatically saturated, and (b) a monocarboxylic acid ester of a $C_2$-$C_{12}$ monofunctional alcohol wherein the monocarboxylic acid contains from 16 to 24 carbon atoms and is olefinically mono- or poly-unsaturated.

28. A drilling fluid as in claim 22 wherein said fluid further contains an ester of a $C_1$-$C_5$ monocarboxylic acid and a monofunctional alcohol.

29. An invert emulsion drilling mud composition as in claim 12 wherein said ester of a $C_1$-$C_5$ monocarboxylic acid and a monofunctional alcohol is present in an amount of about 50 percent by weight, based on the weight of said oil phase.

30. An invert emulsion drilling mud composition as in claim 11 wherein said lime is present in an amount of less than about 2 lbs./barrel of said drilling mud composition.

* * * * *

Disclaimer 5,403,822—Heinz Mueller, Monheim; Claus-Peter Herold, Mettmann; Stephan von Tapavicza, Erkrath; Michael Neuss, Cologne; Wolfgang Zoellner, Duesseldorf; Frank Burbach, Meerbusch, all of Germany. ESTERS OF CARBOXYLIC ACIDS OF MEDIUM CHAIN-LENGTH AS A COMPONENT OF THE OIL PHASE IN INVERT DRILLING MUDS. Patent dated April 4, 1995. Disclaimer filed July 17, 1997, by the assignee, Henkel KGaA and Baroid Limited.

The term of this patent shall not extend beyond the expiration date of Pat. No. 5,318,954 and 5,254,531.

*(Official Gazette,* December 9, 1997)

UNITED STATES PATENT AND TRADEMARK OFFICE
Certificate

Patent No. 5,403,822                                                                                       Patented: April 4, 1995

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Heinz Mueller, Monheim, Germany; Claus-Peter Herold, Mettmann, Germany; Stephan von Tapavicza, Erkrath, Germany; Michael Neuss, Koeln, Germany; Wolfgang Zoellner, Duesseldorf, Germany; Frank Burbach, Meerbusch, Germany; and Douglas J. Grimes, Stonehaven, Scotland.

Signed and Sealed this Twenty-fourth Day of June 2003.

JAMES O. WILSON
*Supervisory Patent Examiner*
Art Unit 1623